(12) United States Patent
De Samber et al.

(10) Patent No.: US 10,085,329 B2
(45) Date of Patent: Sep. 25, 2018

(54) OPTICALLY POWERED LIGHTING SYSTEM

(71) Applicant: PHILIPS LIGHTING HOLDING B.V., Eindhoven (NL)

(72) Inventors: Marc Andre De Samber, Lommel (BE); Frank Verbakel, Helmond (NL); Jacobus Petrus Johannes Van Os, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/516,923

(22) PCT Filed: Sep. 25, 2015

(86) PCT No.: PCT/EP2015/072052
§ 371 (c)(1),
(2) Date: Apr. 5, 2017

(87) PCT Pub. No.: WO2016/055283
PCT Pub. Date: Apr. 14, 2016

(65) Prior Publication Data
US 2017/0311425 A1    Oct. 26, 2017

(30) Foreign Application Priority Data
Oct. 9, 2014  (EP) .................................... 14188251

(51) Int. Cl.
H05B 37/00 (2006.01)
H05B 37/02 (2006.01)
H04B 10/116 (2013.01)

(52) U.S. Cl.
CPC ....... *H05B 37/0272* (2013.01); *H04B 10/116* (2013.01)

(58) Field of Classification Search
CPC .............. F21Y 2115/10; F21Y 2101/00; F21Y 2113/13; F21V 9/16; F21V 3/0481;
(Continued)

(56) References Cited

U.S. PATENT DOCUMENTS

2003/0057887 A1    3/2003  Dowling et al.
2010/0327780 A1   12/2010  Hoschopf
(Continued)

FOREIGN PATENT DOCUMENTS

EP    2503852 A1    9/2012
WO    2013108166 A1  7/2013

*Primary Examiner* — Monica C King
(74) *Attorney, Agent, or Firm* — Akarsh P. Belagodu

(57) ABSTRACT

A lighting device (100) is provided comprising optically transmissive emitters and receivers. The receivers are configured to receive power via an optical signal transmitted from a light source (102). Furthermore, the receiver is provided with functionality for converting the optical signal to electrical power and supply an emitter with the electrical power. The optical signal may further comprise an address such that a receiver-emitter pair of the device may be wirelessly individually addressed and controlled. The optical signals of the device are not guided but are free to propagate through optically transmissive receivers, optically transmissive emitters or other optically transmissive materials of the lighting device. This enables a lighting device which provides new light effects in a simple manner.

11 Claims, 3 Drawing Sheets

(58) Field of Classification Search
CPC ...... F21V 13/04; F21V 23/0457; F21V 5/045; F21V 9/08; H05B 33/0845; H05B 37/0272; H05B 33/0809; H05B 33/0815; H05B 33/0842
See application file for complete search history.

(56) References Cited

U.S. PATENT DOCUMENTS

| | | |
|---|---|---|
| 2012/0281879 A1 | 11/2012 | Vlutters et al. |
| 2013/0140995 A1 | 6/2013 | Jones |
| 2013/0328486 A1 | 12/2013 | Jones |

OPTICALLY POWERED LIGHTING SYSTEM

CROSS-REFERENCE TO PRIOR APPLICATIONS

This application is the U.S. National Phase application under 35 U.S.C. § 371 of International Application No. PCT/EP2015/072052, filed on Sep. 25, 2015, which claims the benefit of European Patent Application No. 14188251.4, filed on Oct. 9, 2014. These applications are hereby incorporated by reference herein.

FIELD OF THE INVENTION

The present invention relates to lighting devices. In particular, the present invention relates to communication in lighting devices.

BACKGROUND OF THE INVENTION

Fluorescent and incandescent lighting are commonly used lighting technologies for various lighting applications such as for example illumination of an office space or a shopping mall. However, incandescent lighting is not competitively energy efficient and fluorescent lighting tubes commonly contain environmentally unfriendly elements that are not easily disposed of. In recent years, light emitting diodes (LEDs) have emerged as a strong competitor on the market for lighting applications, mainly due to their superior energy efficiency over other existing technologies.

The previous technology may not reach the high demands on design and functionality which comes with the recent development of lighting devices. For example, new lighting effects are sought after which extend beyond the capabilities of previous technology. Such lighting effects may for example be arbitrarily moving or deformable light patterns.

With increasing complexity of both integrated circuits as well as of circuits comprising discrete components arranged on a PCB follows problems related to the communication between components and providing electrical power to the devices. In order to achieve highly a versatile lighting device, the light sources of the devices has to be able to communicate in a fast and almost simultaneous manner. Furthermore, it would be desirable to be able to place the light sources of a lighting device almost arbitrarily with respect to each other and also with respect to the power source.

With the present technology, communication paths between different components (e.g. light-emitting diodes), and for providing power becomes more and more challenging due to the number of interconnections. For example, with an increasing number of discrete components such as e.g. light-emitting diodes on a PCB, the connection paths becomes more complex while the area of the PCB may be limited, which may in turn lead to limitations in functionality of the final device. Accordingly, it is desirable to find new approaches for addressing the complexity and drawbacks that comes with communication between components of lighting devices for providing versatile lighting.

SUMMARY OF THE INVENTION

A general object of the present invention is to provide a lighting device provided with more flexible communication between different parts of the device.

According to a first aspect of the invention it is therefore provided an lighting device comprising:

an optically transmissive light-emitting device;
an optically transmissive light-receiving device electrically connected to said optically transmissive light-emitting device to form a first receiver-emitter pair; and
a light-source;
arranged such that an optical signal transmitted from said light-source propagates unguided from said light-source, is received by said light-receiving device,
wherein a portion of said optical signal is transmitted through said optically transmissive light-receiving device and said optically transmissive light-emitting device.

An optically transmissive component is a component that may allow for at least enough of an optical signal to pass through a material of the component such that the optical signal may accurately be received by the light-receiving device. Optically transmissive may be e.g. transparent, semitransparent, translucent, or combinations thereof. The light source emits an optical signal which is received by the optically transmissive light-receiving device. The optical signal propagates unguided, in other words, optical signals are not guided from a light source, or any other device to another device but are emitted by the light-source and may propagate freely through both optically transmissive materials and air or any envelope material that surrounds the light source of the light-emitting devices.

The present invention is based on the realization that by using components made from optically transmissive materials, light-sources or other light-emitting devices arranged in the device may transmit optical signals in several directions which enable communication with more than one other light-receiving device. For example, the light-receiving devices are optically transmissive such that the optical signal may at least partly be passed through a material of a light-receiving device. The optical signal may therefore reach e.g. a second optically transmissive light-receiving device independent of location of the light-receiving devices which facilitates an increased number of available arrangements of light-receiving/emitting devices. In such a device, the components arranged therein may communicate through optical signals which will not be obstructed by the optically transmissive components of the device. The invention enables flexibility in designing a structure and layout of a lighting device that is independent of the locations of the components within the device. This way, novel lighting effects may be enabled since communication, for example between different parts of the lighting device or for powering of light-emitting devices may be done without being limited by the physical locations of the light-emitting devices. The flexibility of design includes means for power the optically transmissive components (i.e. optically transmissive light-emitting devices and light-receivers). Thus, a number of electrical connections between components of the device made via physical connections such as wires can be reduced, or even eliminated. Furthermore, increase in lighting system size may increase the spacing between light emitting diodes which means that in prior art, a relatively large amount of substrate (e.g. printed circuit board) must be used with respect to the number of light-emitting devices, thus additional cost and limited shape variations are introduced in prior art. These drawbacks are alleviated by the invention.

According to one embodiment of the invention, said optically transmissive light-receiving device is configured to convert the optical signal emitted by the light-source to electric power, and to provide the electric power to said optically transmissive light-emitting device. Thereby, the optically transmissive light-emitting device may wirelessly be provided with power from the light-source. The light-source may be provided with electrical power from the mains via a power converter. In order to convert the optical signal to electrical power, the optically transmissive light-emitting device may be provided with photovoltaic functionality.

According to another embodiment of the invention, the lighting device may further comprise a second receiver-emitter pair and a second light-source arranged to provide power to said second receiver-emitter pair. In words, there may be a separate light source for each receiver-emitter pair.

According to another embodiment of the invention, the optical signal from said first and second light-sources comprises an address recognized by the respective optically transmissive light-receiving device in the corresponding receiver-emitter pair such that the respective light-emitting device is individually addressed and powered. This way, a user may control, via a processor connected to the light-sources, which of the light-emitting devices connected to a light-receiving device that should be activated. Thereby, optical 3D effects may be obtained with the remotely powered light-emitting devices. Furthermore, dynamic light-effects are enabled.

According to another embodiment of the invention, the lighting device may comprise a plurality of receiver-emitter pairs arranged in a two- or three-dimensional layout structure. Thus, the receiver-emitter pairs may be arranged in a matrix structure which may be embedded or integrated in optically transmissive material which may be solid, fluid, or viscous. The material may act as a carrier for the receiver-emitter pairs. Furthermore, a more visually appealing appearance for a user is possible since it may be possible to obtain a nearly transparent appearance of the entire or at least parts of the lighting device. Each of the receiver-emitter pairs may be considered a pixel each having its own functionality (e.g. receive light, process the received light, emit light). Furthermore, each of the receiver-emitter pairs may further have an associated optically transmissive processor for recognizing the address of the received light and thereby determine if the associated light-emitting device should emit an optical signal.

Preferably, the wavelength of said optical signal emitted by the light source for providing power is outside the visible range of wavelengths. The optical range of wavelengths is approximately 400-800 nm. The preferred range of wavelengths is with the blue to UV-A range or the Near Infrared range. Furthermore, the emitter of the receiver-emitter pair may preferably emit visible light.

The optically transmissive light-receiving device and the optically transmissive light-emitting device of a receiver-emitter pair may be arranged such that they form a mechanically integrated unit.

According to an embodiment of the invention, said receiver-emitter pair may be electrically connected to a second optically transmissive light-receiving device.

Furthermore, the receiver-emitter pair may be electrically connected to a second optically transmissive light-emitting device.

In other words, the lighting device may comprise a second receiver and/or a second emitter. Thereby, additional functionality, such as communication between two receiver-emitter pairs with optical signals may be enabled.

The second optically transmissive light-emitting device may be configured to emit an optical signal depending on information content received by said second light-receiving device. The light-emitting device may act as a pixel output which may be controlled by information received by the further optically transmissive light-receiving device. The received information may be embedded in an optical signal received by the further optically transmissive light-receiving device. The information content may be processed by a processor (which may be optically transmissive) connected to the optically transmissive light-emitting device of the receiver-emitter pair and the further receiver-emitter pair of the same unit. The further optically transmissive light-receiving device may be electrically connected to the optically transmissive light-emitting device. This opens for the possibility to allow communication between receiver-emitter units of the lighting device. Thereby, cross-communication within the lighting device may be enabled which may further improve the flexibility in controlling the light-emitting devices.

The light-source is preferably arranged separate and at a distance from the optically transmissive light-receiving device. For example, the light-source may be arranged such that no physical connection is present between the light-source and the optically transmissive light-receiving device.

Moreover, the lighting device may comprise a feedback mechanism configured to switch off the light-source if said separation exceeds a predetermined distance. The feedback mechanism may comprise an optical receiver or a mechanical switch.

Furthermore, each of the pixels comprising the receiver-emitter pair may comprise an energy storage which may be charged by the optical signal. This way, the lighting device may be operated in an off-line mode, thus not while being provided with optical power.

The lighting device may further comprise a communication light-source arranged adjacent to said light-source, wherein said communication light-source is configured to send an optical signal to the receiver-emitter pair for controlling the emitter of the receiver-emitter pair. The communication light source may send digital data to all receiver-emitter pairs for communication from a central control unit. The communication light-source may be arranged in the same mechanical unit as the light source for providing power.

Furthermore, the optically transmissive light-receiving device may advantageously be configured to receive optical signals reaching the light-receiving device from all directions, i.e. a receiver may be entirely made from optically transmissive materials. The light-receiving device may advantageously be a solid state phototransistor or photodiode. The light-emitting device may advantageously be a solid state lighting device, in which light is generated through recombination of electrons and holes. Such light-emitting device may advantageously be a light-emitting diode. The optically transmissive light-receiving device is advantageously made from indium-gallium-zinc-oxide. However, the optically transmissive light-receiving device may be made from any other suitable material. Furthermore, the optically transmissive carrier (the solid material) boards may be made from plastic or glass.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the invention, wherein.

DESCRIPTION OF EXAMPLE EMBODIMENTS
OF THE PRESENT INVENTION

In the following description, the present invention is described with reference to example applications. It should, however, be noted that this by no means limits the scope of the invention, which is equally applicable to other applications, such as general light equipments, LED lamps, coded light luminaires, heads-up displays, television sets, and displays.

Figure 1:
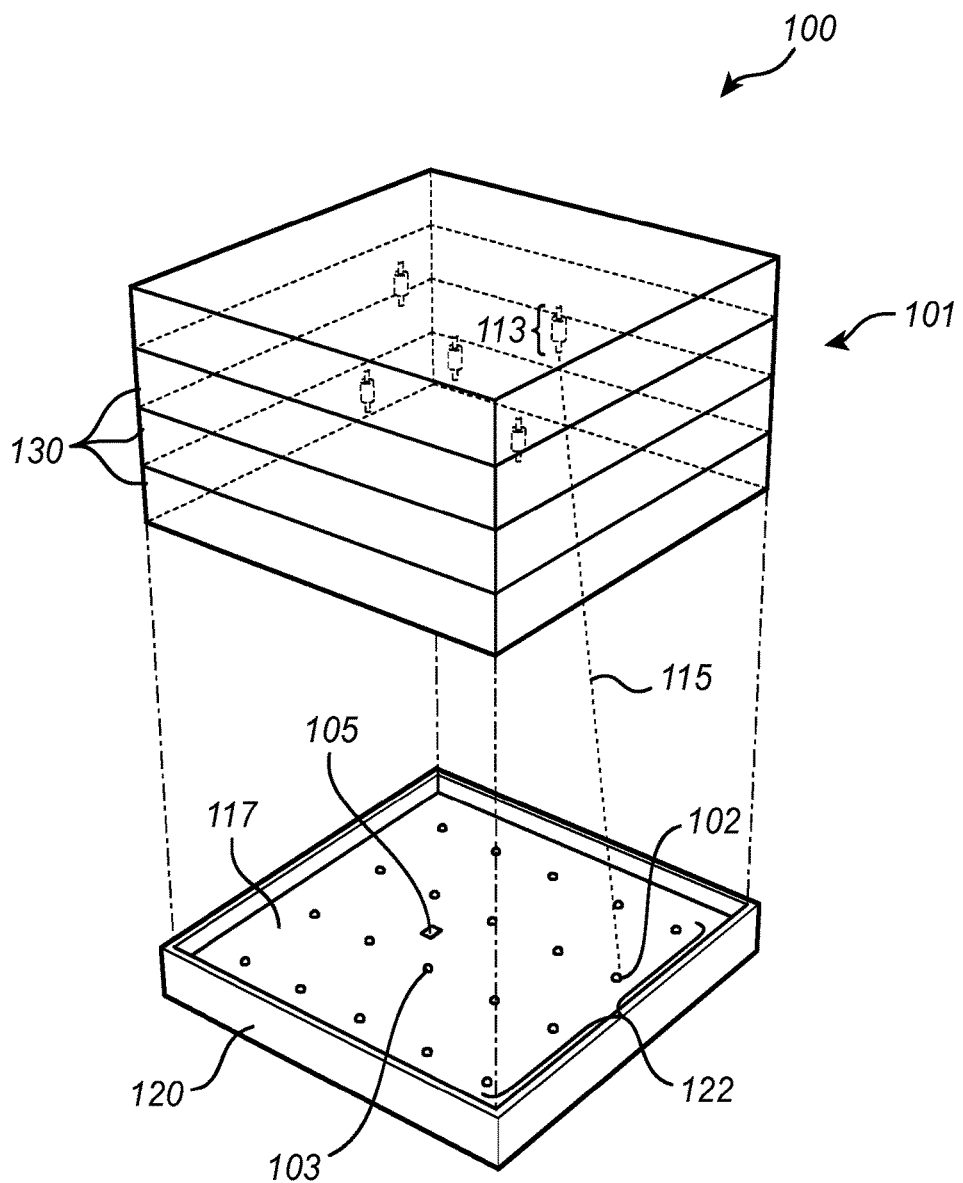
FIG. 1 illustrates a lighting device according to an embodiment of the invention.
Figure 2:
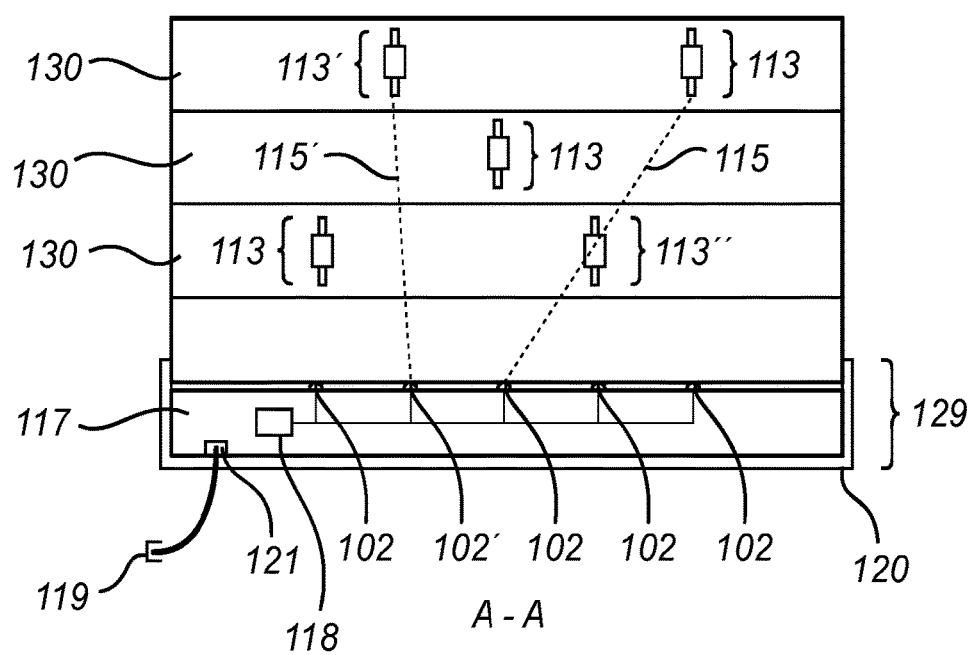
FIG. 2 shows a cross-sectional view of the embodiment shown in FIG. 1.
Figure 3:
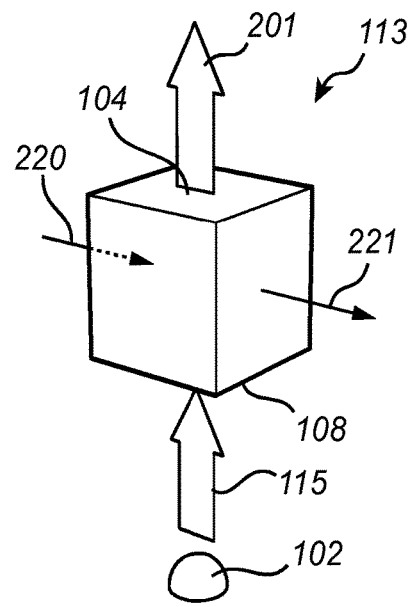
FIG. 3 schematically illustrates a pixel according to an embodiment of the inventive concept.

FIG. 1 illustrates an exemplary lighting device 100 according to an embodiment of the invention. In FIG. 2, a cross-section of the lighting device 100 is shown. In this embodiment, a plurality of light-sources 102, 102' are configured to wirelessly provide power to receiver-emitter units 113, 113'. The light sources 102, 102' are arranged in an "optical backplane" arranged as a bottom plate 117. The light sources 102, 102' of the bottom plate 117 are connected to a power converter 120 configured to convert electrical power from the mains 119 to power appropriate for the light sources 102, 102'. The power converter 120 is connected to the mains 119 at a power inlet 121 of the power converter 120. The wireless power is provided through an optical signal 115, 115' which is received by an optically transmissive light receiving device 108, 108' (as shown in FIG. 3) of a receiver-emitter unit 113, 113'. The units 113, 113' are arranged to form pixels of a light-cube 101. Furthermore, the light cube 101 may be placed on the bottom plate 117 in a slide-in manner without electrical connections between the bottom plate 117 and the light cube 101, the only contact being the obvious mechanical supporting function of the bottom plate 117. Thereby, the light-source 102 is arranged physically separated from the light cube 101. As is shown in FIG. 1, the bottom plate 117 may comprise a two-dimensional array 122 of light-emitting devices 102 (only one is numbered in order to avoid cluttering in the drawing). Moreover, there may be a feedback mechanism unit 105 which detects if the light-cube 101 is removed from the bottom plate 117 and consequently switches off the powering light sources 102 when no power is needed. For example, a mechanical switch may be flipped as a response to the removal of the light-cube 101 from the bottom plate 117, or the feedback mechanism may comprise an optical receiver configured to detect the visual light emitted by the light-emitting devices of the receiver-emitter unit 113 (e.g. emitter 104 shown in FIG. 3), and if the optical receiver of the feedback unit 105 does not detect the visual light, the light-sources 102 are switched off.

In addition, there may optionally be a light source (103) of communication in the bottom plate 117. The communication light-source (e.g. light source 102) may send digital high frequency data to all the receivers 108, 108' of the light cube 101. Thereby, communicating with all the pixels of the light cube 101.

FIG. 3 schematically illustrates an exemplary receiver-emitter unit 113 according to an embodiment of the invention. The receiver-emitter unit 113 may receive optical power from a light-source 102 by receiving an optical signal 115 which is converted by a receiver 108 of the receiver-emitter unit 113. The unit 113 comprises a receiver-emitter pair 104, 108. The receiver 108 has a photovoltaic functionality, thereby comprising a photovoltaic element, for converting an optical signal 115 to electrical power. The emitter 104 configured to emit visible light 201 using the power received from the receiver 108. Furthermore, the receiver-emitter unit 113 may receive an optical signal 220 which may be processed by a processor 106 (shown in FIG. 4) arranged in the unit 113 and may further be used for instructing the processor to control the emitter 104. In addition, receiver-emitter unit 113 may emit an optical signal 221 towards a second receiver-emitter unit for control of the second unit.

Figure 4:
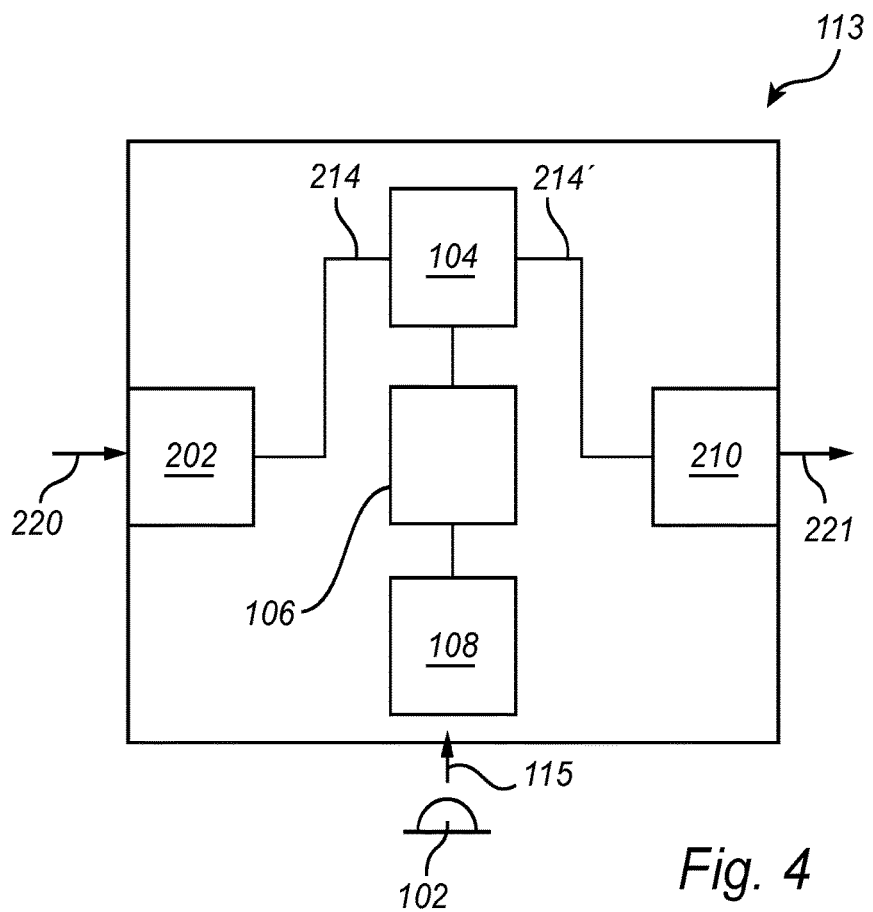
FIG. 4 schematically illustrates exemplary components of a pixel.

FIG. 4 illustrates, in more detail, the receiver-emitter unit 113 schematically shown in FIG. 3. The receiver-emitter unit 113 comprises a receiver-emitter pair comprising the optically transmissive light-receiving device 108 and the optically transmissive light-emitting device 104 with the functionality described with reference to FIGS. 1-3. Furthermore, the receiver-emitter unit 113 comprises a second optically transmissive light-receiving device 202 and, may also comprise a second optically transmissive light-emitting device 210. The emitter 210 and the receiver 202 may be electrically connected via at least a conductor 214, 214'. However, the receiver 202 may first be connected to the emitter 104 of the first receiver-emitter pair 206 with conductor 214. In addition, the emitter 104 is electrically connected via conductor a 214' to the emitter 210 of the second receiver-emitter pair 208. The receiver 108 of is equipped with photovoltaic functionality (i.e. a photovoltaic element) such that it may provide electrical power to at least the emitter 104. The power may also be provided to the second light-receiving device 202 or the second light-emitting device 210. The emitter 104 is configured to emit visible light 201. The conductors 214, 214' may be optically transmissive, and may be made from e.g. indium-tin-oxide (ITO). As shown in FIGS. 3 and 4, the receiver-emitter pair 108, 104 and the additional receiver 202 and additional emitter 210 may be arranged in a mechanical unit, which may constitute a pixel of the light-cube shown in FIG. 1.

The second receiver 202 may be configured to receive an optical signal 220 which may comprise information for the receiver 202 to process with a processing unit 106 connected to the receiver 202 or integrated with the receiver 202. The information may be an instruction for the emitter 104 to emit an optical signal 201 (i.e. light) of a specific wavelength, of flashing frequency, or a certain sequence of flashing, etc. The information received by the receiver 202 may be converted at the receiver 202 to e.g. a TTL (transistor-transistor logic) signal provided to the emitter 104. Moreover, the emitter 104 may be configured to send a signal in the form of a TTL signal to the emitter 210. The signal sent from the emitter 210 comprises information which is forwarded from the present receiver-emitter unit 113 to a second receiver-emitter unit (e.g. unit 113' shown in FIG. 2) of the lighting device. The forwarded signal may be used for synchronizing units of the lighting device. Furthermore, the receiver 202 may comprise an optical filter, a photon detector, amplifiers, and/or a processor. Note that the receivers 202 and 108 may physically be one receiver which may receive both optical signals 220 and 115. The emitter 210 may comprise driver electronics, optical emitter, and/or collimating optics. Optionally, the unit 113 may be embedded in an optical guiding material which may redirect the optical signal around the unit 113, thus improving the propagation of optical signals further.

Each unit 113, and components (106, 104, 108) thereof are optically transmissive meaning that an optical signal, e.g. optical signal 115 may be transmitted through the unit 113", and its components as shown in FIG. 2. Furthermore, the units 113 are arranged in a layered structure, in a 3-dimensional matrix layout. However, the units 113 may also be randomly arranged in the lighting device, inside the light-cube 101. Note also that the number of units 113 may be many more than what is shown in the drawings which illustrate the concept.

Furthermore, with reference to FIG. 2, the power converter 120 comprises a processor 118 providing intelligence for controlling the light-emitting devices 102. The processor is electrically connected to the light sources 102. For example, an optical signal emitted by a light-emitting device 102 for providing power may comprise an address which may be identified by the processing unit 106 connected to the light-receiving device in that unit 113. As a further example, the optical signal 115' for providing power emitted by light-emitting device 102' may comprise an address only identified by the processing unit 106' connected to optically transmissive light-emitting device 104' and optically transmissive light-receiving device 108' in unit 113' (the unit 113' comprises a second receiver-emitter pair). In this way, the light-emitting devices 104, 104' of any of the pixels 113 (i.e. units 113) of the light cube 101 may be individually addressed and powered wirelessly. Furthermore, the bottom plate 117 may comprise a two-dimensional array of light-emitting devices 102. The optical signals 115, 115' for providing power are preferably in the wavelength range of blue to UV-A light, Infrared or Near Infrared light, or at least outside the visible range of the spectrum. The material 130 of the light cube 101 is preferably optically transmissive, for example made from glass or a plastic material. Furthermore, the light cube may be enclosed in a material which reflects the optical signal for powering such that the efficiency of providing power increases through the recycled (reflected) optical signals.

In each of the illustrated embodiments of the invention, the optical signal may propagate unguided from the optically transmissive light-emitting devices or the light-sources to at least one of the optically transmissive light-receiving devices and may propagate through and/or within an optically transmissive material. The light-emitting devices are advantageously light-emitting diodes and the light-receiving devices are advantageously photodiodes or phototransistors.

Additionally, variations to the disclosed embodiments can be understood and effected by the skilled person in practicing the claimed invention, from a study of the drawings, the disclosure, and the appended claims. For example, an optically transmissive component may be any of the light-receiving devices, light-emitting devices, circuit boards, substrates, etc though which an optical signal may propagate.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Summarizing, a lighting device 100 is provided comprising optically transmissive emitters and receivers. The receivers are configured to receive power via an optical signal transmitted from a light source 102. Furthermore, the receiver is provided with functionality for converting the optical signal to electrical power and supply an emitter with the electrical power. The optical signal may further comprise an address such that a receiver-emitter pair of the device may be wirelessly individually addressed and controlled. The optical signals of the device are not guided but are free to propagate through optically transmissive receivers, optically transmissive emitters or other optically transmissive materials of the lighting device. This enables a lighting device which provides new light effects in a simple manner.

The invention claimed is:

1. A lighting device comprising:
   an optically transmissive light-emitting device;
   an optically transmissive light-receiving device having a photovoltaic element electrically connected to said optically transmissive light-emitting device to form a first receiver-emitter pair; and
   a light-source arranged such that an optical power signal transmitted from said light-source propagates unguided from said light-source, and is received by said light-receiving device,
   wherein a portion of said optical signal is transmitted through said optically transmissive light-receiving device and said optically transmissive light-emitting device, and
   wherein said optically transmissive light-receiving device is configured to convert the optical signal emitted by the light-source to electric power, and to provide the electric power to said optically transmissive light-emitting device,
   said lighting device comprising a plurality of said receiver-emitter pairs arranged in a two-or-three-dimensional layout structure and integrated in a solid optically transmissive carrier.

2. The device according to claim 1, further comprising:
   a second receiver-emitter pair and a second light-source arranged to provide power to said second receiver-emitter pair.

3. The device according to claim 2, wherein the optical signal from said first and second light-sources comprises an address recognized by the respective optically transmissive light-receiving device in the corresponding receiver-emitter pair such that the respective light-emitting device is individually addressed and powered.

4. The device according to claim 1, wherein the wavelength of said optical signal emitted by the light source for providing power is outside the visible range of wavelengths.

5. The device according to claim 1, wherein the optically transmissive light-receiving device and the optically transmissive light-emitting device in each receiver-emitter pair form a mechanically integrated unit.

6. The device according to claim 1, wherein said receiver-emitter pair is electrically connected to a second optically transmissive light-receiving device.

7. The device according to claim 6, wherein said second optically transmissive light-emitting device is configured to emit an optical signal depending on information content received from said second optically transmissive light-receiving device.

8. The device according to claim 6, wherein, in said receiver-emitter unit, said further optically transmissive light-receiving device is electrically connected to the optically transmissive light-emitting device, wherein said optically transmissive light-emitting device is configured to emit an optical signal depending on information content received from said further light-receiving device.

9. The device according to claim 1, further arranged and configured such that said light-source is arranged separate and at a distance from said optically transmissive light-receiving device.

10. The device according to claim 9, further comprising a feedback mechanism unit configured to switch off the light-source if said separation exceeds a predetermined distance.

11. The device according to claim 1, further comprising a communication light-source arranged adjacent to said light-source, wherein said communication light-source is configured to send an optical signal to the receiver-emitter pair for controlling the emitter of the receiver-emitter pair.

* * * * *